United States Patent [19]

Jackson et al.

[11] Patent Number: 4,462,055
[45] Date of Patent: Jul. 24, 1984

[54] BULK TAPE ERASING SYSTEM

[75] Inventors: Leon D. Jackson, Troy; Dan O. Morris, Clawson; Alan J. Blohm, Mt. Clemens, all of Mich.

[73] Assignee: LDJ Electronics, Inc., Troy, Mich.

[21] Appl. No.: 336,654

[22] Filed: Jan. 4, 1982

[51] Int. Cl.³ .............................................. G11B 5/02
[52] U.S. Cl. ...................... 360/118; 360/66; 361/151
[58] Field of Search .............. 360/118, 123, 119, 66; 361/151; 335/284

[56] References Cited

U.S. PATENT DOCUMENTS

| | | | |
|---|---|---|---|
| 2,766,328 | 10/1956 | Handschin | 360/66 |
| 3,329,872 | 7/1967 | Amos | 361/151 |
| 4,136,373 | 1/1979 | Amos | 361/151 |
| 4,146,956 | 4/1979 | Fujiwara | 360/118 X |
| 4,180,835 | 12/1979 | Okumura et al. | 360/118 |
| 4,187,521 | 2/1980 | Rotter et al. | 360/118 |
| 4,423,460 | 12/1983 | Jackson et al. | 361/151 |

FOREIGN PATENT DOCUMENTS 2108259 8/1972 Fed. Rep. of Germany ...... 360/118

*Primary Examiner*—John H. Wolff
*Attorney, Agent, or Firm*—Harness, Dickey & Pierce

[57] ABSTRACT

A degaussing head is mounted on a tape drive transport unit adjacent to a rotating reel of tape. The degaussing head is selectively energized by a signal indicating that the tape is to be erased. Preferably, the degaussing head takes the form of an E-shaped iron core driven by a coil supplied with attenuated DC current. The degaussing head is mounted on the door of the tape drive transport cabinet in such a manner that when the door is closed the legs of the degaussing head orthogonally span the tape in the reel to provide an attenuated alternating magnetic field for bulk erasing the tape as it is rotated past the head.

16 Claims, 6 Drawing Figures

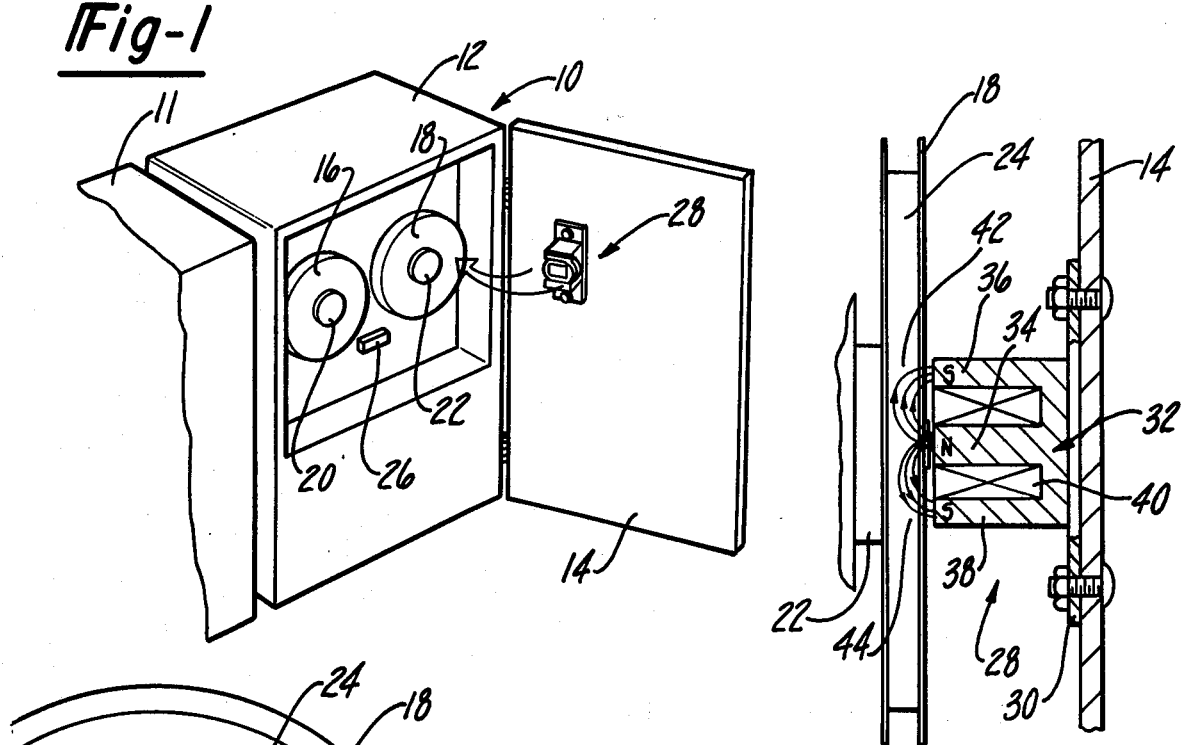

BULK TAPE ERASING SYSTEM

DESCRIPTION

TECHNICAL FIELD

This invention relates to devices for erasing magnetic tape. More particularly, it involves techniques for effectuating the bulk erasure of a rotating reel of tape.

BACKGROUND ART

The use of magnetic tapes has increased in popularity over the years. They can be used to store a variety of information such as audio or visual signals as well as binary data readable by a computer system. The popularity of magnetic tapes is due in large part to the fact that they can be erased and reused.

In the past, tapes were erased primarily by two methods. In one method the reel of tape was physically removed from the environment from which it is normally used and placed into a bulk tape eraser mechanism. This method is disadvantageous because it requires the user to physically remove the tape and carry it to another area where the bulk tape eraser apparatus is located. Many conventional bulk tape erasers require even further interaction from the user, e.g., several passes of the tape must be made underneath the erasing or degaussing head in different angular orientations. In those applications where a large number of tapes must be erased, it becomes apparent that this process is very inefficient.

A second method of erasing tapes employs the well known use of a degaussing head over which the entire length of the tape is passed. Unfortunately, this requires that the tape be completely unwound from the reel in order to accomplish the erasure. This technique takes a considerable length of time which can be especially disadvantageous with large reels of tape such as are commonly used in computer tape drive transport units.

The present invention is directed to solving one or more of these problems.

DISCLOSURE OF THE INVENTION

Bulk tape erasing techniques are provided according to the present invention for use with a tape drive transport unit. A bulk degaussing head is mounted on the unit adjacent to a rotating reel of tape. Preferably, the degaussing head is selectively energized in response to control signals indicating that the tape is to be erased. The degaussing head is adapted to apply a magnetic field generally parallel to the segment of the tape rotating past the head.

The present invention finds particular utility in association with a computer system utilizing a tape transport unit. The computer is adapted to read certain data portions on the tape and make a decision as to whether or not the tape is to be erased. If the tape is to be erased, the computer sends a signal to interface circuitry which controls the operation of a programmable DC power supply connected to the coil of the degaussing head as disclosed in one embodiment.

In the preferred embodiment, the degaussing head takes the form of an E-shaped iron core and a coil wound around the middle leg to provide it with an opposite magnetic polarity than the two outer legs. This construction provides magnetic flux fields running in opposite directions, one field being parallel with the direction of tape rotation and the other being anti-parallel to the direction of tape rotation. The current from the DC power supply is attenuated. Consequently, the tape experiences an attenuated magnetic field of alternating polarities as the tape carrier rotates under the degaussing head.

BRIEF DESCRIPTION OF THE DRAWINGS

These and other advantages of the present invention will become apparent upon reading the following specification and by reference to the drawings in which:

FIG. 1 is a perspective view of a computer tape drive transport unit incorporating the bulk tape erasing apparatus of the preferred embodiment;

FIG. 2 is a front plan view showing the position of the degaussing head with respect to a tape reel;

FIG. 3 is a side view showing primarily the relationship between the degaussing head and the tape reel;

FIG. 4 is a block diagram of cicuitry used in the preferred embodiment to control the energization of the degaussing head;

FIG. 5 is a waveform diagram illustrating the attenuation of the current applied to the degaussing head; and FIG. 6 is a waveform illustrating the magnetic field applied to a segment of the rotating tape.

DESCRIPTION OF THE PREFERRED EMBODIMENT

The present invention finds particular utility in connection with a computer tape drive transport unit 10 which is a part of a computer system including processor 11. However, it should be noted from the outset that the broader aspects of this invention may find use in a variety of other applications. Thus, the particular environment in which this invention is described should not necessarily be considered to be a limiting example. For instance, it is envisioned that this invention can be used on any tape drive mechanisms in which it would be desirable to erase data on the tape in bulk.

Keeping this caveat in mind, transport 10 includes a cabinet 12 with a swinging door 14. The front face of cabinet 12 is indented to provide space for mounting reels 16 and 18 on drive spindles 20 and 22, respectively. Normally, reel 16 serves as a supply reel and reel 18 as a take up reel. The magnetic tape 24 spirally wound about supply reel 16 is generally fed through read/write head 26 and then wound around take up reel 18.

A degaussing head 28 is mounted on cabinet 12 adjacent to one of the tape reels. In this embodiment, head 28 is mounted on door 14 by way of a suitable bracket 30 bolted to door 14. Head 28 is positioned on door 14 such that when door 14 is closed head 28 is positioned adjacent to reel 18 as can be seen most clearly in FIGS. 2 and 3.

Degaussing head 28 includes an E-shaped iron core 32 having a middle leg 34 and two outer legs 36 and 38. Each leg has a sufficient length so as to substantially span the area on reel 18 on which the entire length of tape 24 is wound. A coil 40 is wound around the middle leg 34 in such a manner that the end of leg 34 serves as a north pole whereas legs 36 and 38 serve as south poles. As can be seen most clearly in FIG. 3 this arrangement produces magnetic flux lines which run substantially parallel to the circumference of tape 24. As will be explained later herein, reel 18 is rotated in a counterclockwise direction during the tape erasing process. Degaussing head 28 thus produces a first magnetic field represented by flux lines 42 paralleling tape rotation whereas flux lines 44 are anti-parallel with the direction of tape rotation.

In operation, the computer processor 11 reads certain information on tape 24 and then makes a decision as to whether or not the tape should be erased. This can be accomplished in several different ways. For example, the end of the tape may include erasure decisional information which is read by the computer through read-/write head 26. In such a manner, the tape on take up reel 18 will either be erased or saved. Alternately, the computer may read information on the front end of tape 24 and make a decision as to whether or not the tape may be erased. The computer software could be capable of reading the title of the tape and compare it with a preprogrammed list of tape titles that should be erased. For example, if various tapes contain weather data titled according to time periods, the computer could identify obsolete tapes and cause them to be erased automatically. In such instances, the supply reel 16 would be caused to reverse its direction to rewind that portion of the tape back onto the supply reel 16. If this mode of operation is used the position of the degaussing head 30 will be moved adjacent to the supply reel 16 instead of the take up reel 18 as shown in the drawings. Alternatively, two degaussing heads 28 can be used, one for each reel. In any event, once the computer (or other logic) decides that the tape is to be erased, it will generate a control signal over line 50 to computer interface 52 as shown in FIG. 4. Tape transport 10 is also directed to continue rotating the reel on which the tape to be erased is wound.

Computer interface 52 serves to detect the control signals, generally in the form of a data word, from the computer. In response to the control signal interface 52 operates to energize programmable DC power supply 54. Supply 54 is a conventional device which converts AC power on line 56 to direct current (DC) power on line 58. Line 58 is connected to coil 40. The amount of current supplied to coil 40 is a function of the signals applid to the control input over line 60 from interface 52. Preferably, power supply 54 is operative to provide an attenuating current to coil 40 as shown in FIG. 5. This may be accomplished by a ramp generator circuit (not shown) in computer interface 52 which is coupled to the control input of power supply 54 over line 60 whenever an erase signal is received.

It will be remembered that although the degaussing head 10 is stationary when it is energized, the tape reel will continue to rotate. Each segment of the tape will experience a magnetic field of a polarity and magnitude shown in FIG. 6. For example, as one segment of tape 24 passes through flux field 44 it will experience a magnetic field in an antiparallel direction to tape rotation. This is represented by point "a" in FIG. 6. As the reel continues to rotate the tape segment will then experience a parallel flux field 42 as represented by point "b" in FIG. 6. As the tape segment continues to rotate away from head 28 it experiences little or no magnetic field. When the tape segment returns underneath head 28 it will experience substantially the same phenomena. However, the attenuated drive current to coil 40 will cause a proportional decrease in magnetic strength in flux fields 42 and 44. This is represented in FIG. 6 by the decreasing peaks in the waveform.

One skilled in the art can now appreciate that the present invention has considerable advantages over the conventional tape erasing techniques. Erasure of the tape occurs completely automatically with no operator involvement required. The attenuated magnetic field with reversing polarities provides not only destruction of the data on the tape but also high quality erasure thereof. The domains of the magnetic particles on the tapes are randomly oriented parallel with the lengthwise direction of the tape. This keeps the noise level to a minimum when the tape is reused. Again, it should be understood that while this invention was described in connection with particular examples thereof, no limitation is intended thereby except as defined in the appended claims. For example, it is possible to make the bulk degaussing head from permanent magnets. In such a construction the attenuation of the magnetic field could be accomplished by slowly opening the door to increase the spacing between the head and the rotating tape. Alternatively, a plate of high magnetic permeable material could be used to selectively shunt the magnetic field and prevent it from reaching the tape. Still other modifications will become apparent to one skilled in the art after a study of the specification, drawings and claims.

We claim:

1. Bulk tape erasing apparatus, said apparatus comprising:
   first means for mounting a degaussing head adjacent to a rotating reel of tape so that magnetic fields from the head span a radially extending segment of the reel;
   a DC power supply connected to the degaussing head; and
   means for selectively energizing said power supply in response to a signal indicating that the tape is to be erased.

2. The apparatus of claim 1 wherein said degaussing head is adapted to apply at least one magnetic field generally parallel to the tape on the reel.

3. The apparatus of claim 2 wherein said degaussing head includes a multi-legged iron core and a coil adapted to create a magnetic field with flux lines running generally perpendicularly to the ends of the legs.

4. The apparatus of claim 3 wherein said core is E-shaped with the middle leg being of opposite magnetic polarity than the outer legs.

5. The apparatus of claim 4 wherein said degaussing head is mounted on a door of the a transport unit in such a manner than when the door is closed the legs of the degaussing head are orthogonally positioned adjacent said segment of the reel.

6. The apparatus of claim 1 which further comprises means for attenuating drive current supplied to the degaussing head.

7. In a computer system having a tape drive transport unit with at least one reel of magnetic tape thereon, drive means for rotating the reel, and read means for reading information on the tape, the improvement comprising means for bulk erasing the information on the tape, said means including:
   a degaussing head having a generally E-shaped iron core with a coil surrounding the middle leg;
   means for mounting the degaussing head on a door of the tape transport unit in such a manner that when the door is closed the legs of the degaussing head orthogonally span a radially extending segment of the tape in the reel;
   a programmable DC power supply connected to the coil;
   interface means connected between the power supply and the computer, operative for controlling the energization of said power supply upon receipt of a control signal from the computer; and said computer being adapted to read information on the tape and generate said control signal when the tape is to be erased, said computer being further operative to activate said drive means to rotate said reel when the degaussing head is energized.

8. The improvement of claim 7 wherein said power supply is adapted to provide an attenuated current to the coil of the degaussing head.

9. A method of erasing magnetic tapes on reels in a tape drive transport unit, said method comprising:
mounting a degaussing head on the unit adjacent to one of the tape reels so that magnetic fields from the head span a radially extending segment of the reel;
reading information on the tape and generating a control signal if the tape is to be erased;
energizing said degaussing head with an attenuated DC current while rotating said tape reel to erase information thereon in response to said control signal.

10. The method of claim 9 which further comprises:
generating a first magnetic field parallel with the direction of tape rotation and a second field anti-parallel to the direction of tape rotation.

11. Apparatus for erasing tape on reels, said apparatus comprising:
a bulk degaussing head; and
means for mounting said bulk degaussing head adjacent to a rotating reel of tape so that magnetic fields from the head span a radially extending segment of the reel whereby said head operates to degauss the tape in bulk as it rotates past the head.

12. The apparatus of claim 11 which further comprises means for attentuating the magnetic field applied to the tape.

13. The apparatus of claim 12 wherein said head is constructed of permanent magnets.

14. The apparatus of claim 13 wherein the magnetic field is attenuated by increasing the spacing between the head and the tape.

15. The apparatus of claim 13 wherein the magnetic field is attenuated by shunting the magnetic field through a device disposed between the head and the tape.

16. The apparatus of claim 12 wherein said head is adapted to generate a first magnetic flux field running parallel to the direction of tape rotation and a second field running anti-parallel to tape rotation.

* * * * *